United States Patent Office 3,632,858
Patented Jan. 4, 1972

3,632,858
PHENOLIC SUBSTITUTED BENZOPHENONES AS ANTIOXIDANTS FOR POLYOLEFINS
Jerry Peter Milionis, Somerset, and Frank Meritt Furman, Somerville, N.J., assignors to American Cyanamid Company, Stamford, Conn.
No Drawing. Filed Feb. 27, 1969, Ser. No. 803,110
Int. Cl. C07c 49/82
U.S. Cl. 260—591    5 Claims

ABSTRACT OF THE DISCLOSURE

Compounds represented by Formulae I and II:

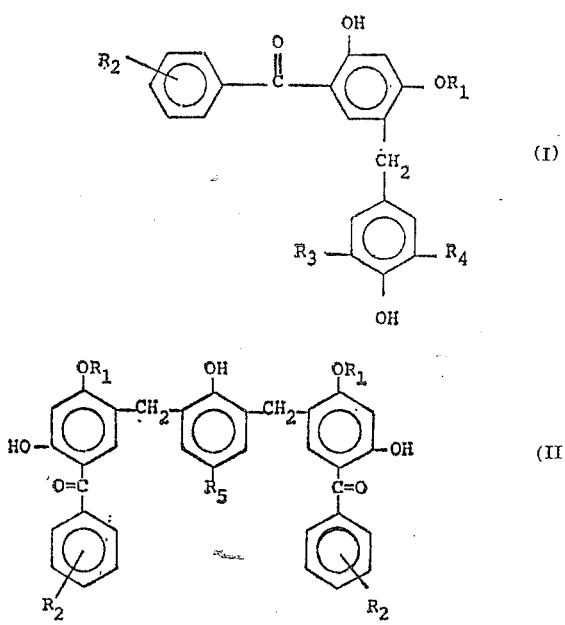

and stabilized polyolefin compositions containing said compounds are provided. In the formulae, $R_1$ is alkyl of 1 to 18 carbons or aralkyl; $R_2$ is hydrogen, alkyl of 1 to 4 carbons, carboxy, carboalkoxy or halogen; $R_3$ and $R_4$ are hydrogen or alkyl of 1 to 12 carbons, except that at least one of $R_3$ and $R_4$ is an alkyl group which is branched on the alpha carbon atom; and $R_5$ is alkyl of 1 to 12 carbons or aralkyl.

This invention relates to novel hydroxybenzophenones and their use as stabilizers for polyolefins. More particularly the present invention relates to novel condensation products produced from hydroxybenzophenones and hindered phenols and their use to stabilize polyolefins against oxidative deterioration.

Unstabilized polyolefins, particularly polypropylene, are generally rather unstable in that they become oxidized upon contact with the atmosphere and as a result become brittle to an undesirable degree. It therefore is desirable to improve oxidation resistance of polyolefins without adversely effecting the physical and chemical characteristics of the polymer. Presently this is accomplished by incorporating in the polyolefin, in relatively small amounts, compounds which have been found to enhance oxidation stability. The oxidation of polypropylene has been found to result from exposure to either ultraviolet light or heat. It is believed that ultraviolet light catalyzes the formation of carbonyl groups in the polymer chain. This is alleviated by incorporating an ultraviolet light absorber into the polymer. On the other hand, embrittlement caused by heat is reduced by incorporating an antioxidant into the polymer. At the present time, hydroxybenzophenone compounds are commonly employed in polymeric compositions to improve stability against discoloration caused by ultraviolet light. However, prior to the present invention, hydroxybenzophenones have not been known to be useful as antioxidants in polyolefins.

It is an object of the present invention to provide novel hydroxybenzophenone condensation products. It is a further object of the present invention to provide polyolefin compositions having improved oxidation stability. Further objects of the present invention will become obvious in view of the following detailed disclosure.

In accordance with the present invention there are provided novel compounds represented by Formulae I and II:

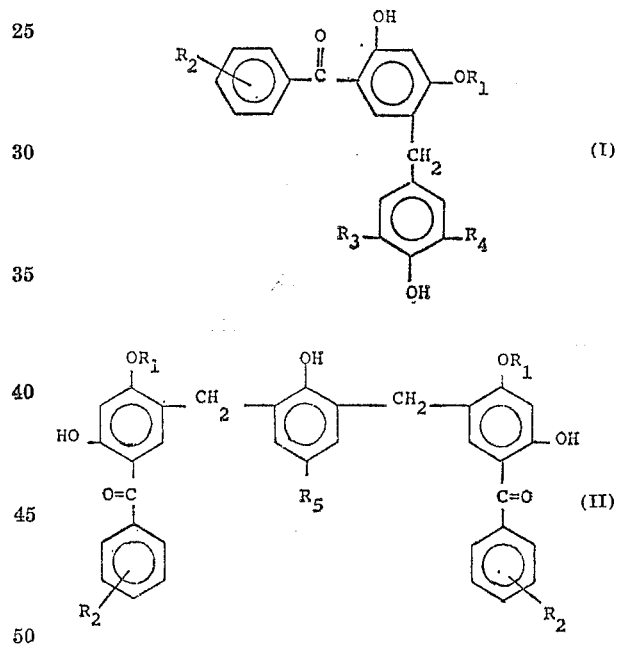

wherein $R_1$ is alkyl of 1 to 18 carbons (including cycloalkyl of 5 to 6 carbons), or aralkyl (especially monocyclic ar(lower-alkyl); $R_2$ is hydrogen, alkyl of 1 to 4 carbons, carboxy, carboalkoxy of 1–8 carbons, or halogen, preferably chlorine; $R_3$ and $R_4$ are hydrogen or alkyl of 1 to 12 carbons, at least one of the $R_3$ and $R_4$ radicals being branched on the alpha carbon atom; and $R_5$ is alkyl of 1 to 12 carbons (including cycloalkyl of 5 to 6 carbons) or aralkyl (especially monocyclic ar(lower-alkyl).

The novel compounds of the present invention are prepared by a condensation reaction between (a) a hydroxybenzophenone represented by Formula III and (b) a hindered phenol represented by Formula IV or Formula V.

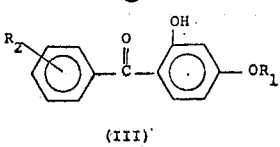

(III)

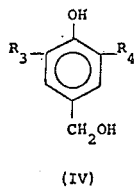

(IV)

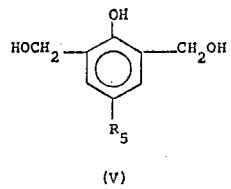

(V)

wherein $R_1$, $R_2$, $R_3$, $R_4$ and $R_5$ are defined above. The condensation reaction is effected at temperatures in the range of about 25° C. and 100° C. in a period of about 1 to 30 hours. The condensation reaction can be effected either in the presence of a catalyst or without a catalyst. Suitable catalysts which can be employed are acid catalysts such as sulfuric acid, p-toluene sulfonic acid, and the like. During reaction, a diluent is employed which preferably effectively dissolves or disperses the reactants and which does not exert a significant solvent action upon the product. Suitable solvents include lower alkanols such as methanol, ethanol, isopropanol and the like; hexane, and the like; and formic acid, or the like. Upon completion of the reaction, the reaction mixture is cooled to room temperature to form a precipitate which is recovered and purified in any manner known in the art such as by recrystallization.

Conditions can be adjusted in the case of reaction between a benzophenone of Formula III and a dialkylphenol of Formula IV to give a product with either one or two alkyl groups. Thus, the presence of an acid catalyst and the use of severe conditions tends to lead to the removal of one of the $R_3$ or $R_4$ alkyl groups from the phenyl ring. Increased severity of conditions such as high temperatures or longer reaction times increase the amount of dealkylation which occurs. Conversely, operating in the absence of catalyst decreases the amount of dealkylation which occurs.

Among the useful hydroxybenzophenones represented by Formula III which are employed in the present invention are 2-hydroxy-4-octyloxy-4'-butylbenzophenone, 2-hydroxy-4-methoxy-4'-chlorobenzophenone; 2-hydroxy-4 - methoxy - 4' - carbomethoxybenzophenone; and 2-hydroxy-2'-carboxy-4-methoxybenzophenone. Preferred hydroxybenzophenones are 2-hydroxy-4-octyloxybenzophenone, 2-hydroxy-4-dodecyloxybenzophenone and 2-hydroxy-2'-methyl-4-octyloxybenzophenone.

The phenolic compounds represented by Formula IV, and V are obtained in a manner well known in the art as for example by hydroxymethylation of an alkylated phenol. Suitable methylolated phenols which can be employed include 2,6-di-t-butyl-4-methylolphenol, 2-t-butyl-4-methylolphenol, 2,6-dimethylol-p-cresol, 2,6-dimethylol-4-cyclohexylphenol, and the like.

The compounds of the present invention impart unexpectedly enhanced oxidation stability to polymers of olefins of 2–4 carbons, e.g., such as polyethylene, polybutylene and especially polypropylene. The antioxidant activity of the compounds of the present invention is surprising in view of the fact that hydroxybenzophenones in general are known to impart stability to polymers against ultraviolet light but they do not exhibit any measurable antioxidant properties when employed alone. Furthermore, the results obtained when employing the compounds of the present invention in polyolefins are surprising in view of the limited protection afforded by presently employed hindered phenols towards antioxidation. The amount of antioxidant employed in the compositions of the present invention is between about 0.05 and about 5 weight percent, preferably between about 0.1 and about 1 weight percent based upon the weight of the polyolefin.

The antioxidants of the present invention can be employed in polyolefins either alone or in the presence of other stabilizers. Suitable secondary stabilizers which can be employed herein include derivatives of thiodipropionic acid as are disclosed in U.S. Pat. 3,072,604 issued to Tholstrup. These are typified by esters such as dilaurylthiodipropionate, distearylthiodipropionate, ditridecyclthiodipropionate, and the like. Organic phosphites as are described in U.S. Pat. 3,039,993 such as tridecylphosphite, triethylphosphite, trioctylphosphite, diphenyldecylphosphite, phenyldidecylphosphite, distearylpentaerythritolbiphosphite, trilauryltrithiophosphite and the like, can also be used along with the compounds of this invention. Generally these materials, if employed, are used in concentrations of 0.1 to 1% based on the weight of the polyolefin substrate.

The antioxidants of the present invention can be employed either alone or in the presence of conventional additives employed in polymer compositions. Thus, an additional ultraviolet light absorber can be employed in the polymer. Any ultraviolet light absorber can be used so long as it performs the functions generally required of an ultraviolet light absorber for polyolefins. These functions are well known to be high absorbency in the region of about 300–400 millimicrons, low absorbency above about 400 millimicrons, and solubility in and compatibility with polyolefins and stability to light and heat.

The present invention is further illustrated by the examples which follow and are not intended to limit the same.

EXAMPLE 1

5-(3'-tert.-butyl-4'-hydroxybenzyl)-2-hydroxy-4-octyloxybenzophenone

A mixture of 32.6 gms. of 2-hydroxy-4-(n-octyloxy)-benzophenone, 24.2 g. of 2,6 - di-tert.-butyl-4-hydroxymethylphenol, 50 ml. of formic acid and 5 g. of p-toluene sulfonic acid was heated for 4 hours at 97° C. and it was thereafter cooled to room temperature. The precipitate was filtered, washed with water, and recrystallized from ethanol to give the product, 5-(3'-tert.-butyl-4'-hydroxybenzyl) - 2-hydroxy-4-octyloxybenzophenone, M.P. 151–152° C.

Under the conditions described one of the tertiary butyl groups of 2,6-di-tert.-butyl-4-hydroxymethylphenol was removed by dealkylation.

EXAMPLE 2

5-(3'-tert.-butyl-4'-hydroxybenzyl)-2-hydroxy-4-dodecyloxybenzophenone

When 48.2 grams of 2-hydroxy-4-dodecyloxybenzophenone and 24.2 grams of 2,6-di-tert.-butyl-4-hydroxymethylphenol were reacted as described in Example 1 the product 5-(3'-tert.-butyl-4'-hydroxybenzyl)-2-hydroxy-4-dodecyloxybenzophenone was obtained on recrystallization from methanol, M.P. 117–118° C. Dealkylation occurred as in Example 1.

EXAMPLE 3

5-(3'-tert.-butyl-4'-hydroxybenzyl)-2-hydroxy-4-octyloxy-2'-methylbenzophenone

Following the procedure of Example 1, 34.0 grams of 2'-methyl-2-hydroxy-4-octyloxybenzophenone was reacted with 24.2 grams of 2,6-di-tert.-butyl-4-hydroxymethylphenol. The product 5-(3'-tert.-butyl-4'-hydroxybenzyl)-2 - hydroxy - 4-octyloxy-2'-methylbenzophenone was obtained on recrystallization from methanol, M.P. 133–134° C. Dealkylation occurred as in Example 1.

EXAMPLE 4

2,6-bis(2'-octyloxy-4'-hydroxy-5'-benzoylbenzyl)-4-methylphenol

A mixture of 65.3 grams of 2-hydroxy-4-octyloxybenzophenone and 16.8 grams of 2,6-dimethylol-p-cresol in 75 ml. of formic acid was heated for 5 hours at 103° C. using 5 grams of p-toluenesulfonic acid as catalyst. The product 2,6-bis(2'-octyloxy-4'-hydroxy-5'-benzoylbenzyl)-4-methylphenol was isolated as a viscous oil which crystallized from methanol, M.P. 100–103° C.

EXAMPLE 5

5-(3',5'-di-tert.-butyl-4'-hydroxybenzyl)-2-hydroxy-4-octyloxybenzophenone

A mixture of 32.6 grams of 2-hydroxy-4-octyloxybenzophenone and 26.2 grams of 2,6-di-tert.-butyl-4-hydroxymethylphenol in 50 ml. of formic acid was heated for about 24 hours at 100–104° C. The reaction mixture was cooled, washed with three 200 ml. portions of water followed by 50 ml. of cold methanol and 50 ml. of warm methanol, all by decantation. The resulting oil was dissolved in 300 ml. of hot methanol and allowed to crystallize slowly at room temperature. The impure crystals were recrystallized from ethanol to give a yellow compound, 5 - (3',5' - di-tert.-butyl-4'-hydroxybenzyl)-2-hydroxy-4-octyloxybenzophenone, M.P. 107–108° C.

Under the milder conditions described above, in the absence of a catalyst, no dealkylation occurred.

EXAMPLE 6

The following compounds were tested for antioxidant activity in polypropylene by milling in 0.2% on the weight of the polypropylene, of each compound and forming 15–20 mil plaques by compression molding. The plaques containing the compounds were exposed to a temperature of 140° C. in a forced draft oven and the hours to embrittlement noted.

Experimental data are shown in Table I.

Stabilizers (A) The compound of Example 1.
(B) The compound of Example 2.
(C) The compound of Example 3.
(D) The compound of Example 4.
(E) The compound of Example 5.
(F) 2,6-di-tertiary butyl-p-cresol
(G) 4,4'-thiobis(6-tertiary butyl-m-cresol)
(H) 4,4'-butylidinebis(6-tertiary butyl-m-cresol)

TABLE I

| No. | Stabilizer | Hours to embrittlement at 140° C. |
|---|---|---|
| 1 | A | 170 |
| 2 | B | 300 |
| 3 | C | 140 |
| 4 | D | 220 |
| 5 | E | 260–270 |
| 6 | F[1] | 4 |
| 7 | G[1] | 45 |
| 8 | H[1] | 12 |
| 9 | None (control) | 4 |

[1] Commercially available stabilizer.

The data illustrate that the compounds of this invention (stabilizers A–E) are considerably more effective as antioxidants for polypropylene than well known, commercially available polypropylene antioxidants (stabilizers F–H).

Table II shows the effectiveness of the compounds of this invention as stabilizers against embrittlement caused by ultraviolet light when used in polypropylene in the same concentration (0.2%).

TABLE II

| No. | Stabilizer | Fade-Ometer exposure (hours to embrittlement) |
|---|---|---|
| 1 | A | 300 |
| 2 | B | 150 |
| 3 | C | 150 |
| 4 | D | 150 |
| 5 | E | 300–400 |
| 6 | F | 150 |
| 7 | G | 100 |
| 8 | H | 150 |
| 9 | None (control) | <100 |

As can be seen from Table II, the stabilizers of the present invention are at least as effective as three stabilizers which are presently employed.

EXAMPLE 7

The antioxidant activity of the compounds of this invention in combination with esters of 3,3'-thiodipropionic acid, well known secondary stabilizers for polyolefins, was studied by incorporating them into polypropylene in the manner described in Example 6. The compounds of Example 1 (Stabilizer A), the compounds of Example 4 (Stabilizer D), dilauryl-3,3'-thiodipropionate (Stabilizer J) and distearyl-3,3'-thiodipropionate (Stabilizer K) were used for these tests.

Table III shows the test results.

TABLE III

| No. | Stabilizer (percent) | Hrs. to embrittlement at 140° C. |
|---|---|---|
| 1 | A (0.1) | 40 |
| 2 | K (0.2) | 230 |
| 3 | A (0.1) plus K (0.2) | 570 |
| 4 | D (0.2) | 220 |
| 5 | J (0.2) | 140 |
| 6 | D (0.2) plus J (0.2) | 600 |

The data in Table III demonstrate the enhancement in antioxidant activity when esters of 3,3'-thiodipropionic acid are used along with the compounds of this invention.

EXAMPLE 8

The antioxidant activity of the compounds of this invention in combination with organic phosphite stabilizers for polypropylene, was studied by incorporating the test compounds in the manner described in Example 6. Concentrations in Table IV are expressed as weight percent based on the polypropylene. The antioxidant of Example 1 (Stabilizer A), the antioxidant of Example 4 (Stabilizer D) and phenyl diodecyl phosphite (Stabilizer L) were used in this test. The results are given in Table IV.

TABLE IV

| No. | Stabilizer (percent) | Hrs. to embrittlement at 140° C. |
|---|---|---|
| 1 | A (0.2) plus (0.2) | 230 |
| 2 | L (0.2) | 4 |
| 3 | A (0.2) | 190 |
| 4 | D (0.2) plus (0.2) | 500 |
| 5 | D (0.2) | 220 |

The data in Table IV illustrates the enhancement of antioxidant activity in polypropylene which is obtained by using phosphite stabilizers along with the compounds of this invention.

What is claimed is:

1. The compound 5-(3'-tert.-butyl-4'-hydroxybenzyl)-2-hydroxy-4-octyloxybenzophenone.

2. The compound 5-(3'-tert.-butyl-4'-hydroxybenzyl)-2-hydroxy-4-dodecyloxybenzophenone.

3. The compound 5-(3'-tert,-butyl-4'-hydroxybenzyl)-2-hydroxy-4-octyloxy-2'-methylbenzophenone.

4. The compound 2,6-bis(2'-octyloxy-4'-hydroxy-5'-benzoylbenzyl)-4-methylphenol.

5. The compound 5-(3,5'-di-tert.-butyl-4'-hydroxybenzyl)-2-hydroxy-4-octyloxybenzophenone.

References Cited

UNITED STATES PATENTS 3,395,184  7/1968  Dressler et al. _____ 260—591

DANIEL D. HORWITZ, Primary Examiner